United States Patent [19]
Lo et al.

[11] Patent Number: 6,097,767
[45] Date of Patent: Aug. 1, 2000

[54] APPARATUS AND METHOD FOR DETERMINING AN OPTIMUM EQUALIZER SETTING FOR A SIGNAL EQUALIZER IN A COMMUNICATION NETWORK RECEIVER

[75] Inventors: William Lo, Cupertino; Yi Cheng, San Jose; Bin Guo, Fremont, all of Calif.

[73] Assignee: Advanced Micro Devices, Inc., Sunnyvale, Calif.

[21] Appl. No.: 09/061,252

[22] Filed: Apr. 17, 1998

[51] Int. Cl.[7] ....................................................... H03D 3/18
[52] U.S. Cl. ............................ 375/327; 375/232; 375/376
[58] Field of Search .................................... 375/327, 324, 375/316, 371, 373, 276, 232, 229, 233

[56] References Cited

U.S. PATENT DOCUMENTS

| | | | |
|---|---|---|---|
| 3,878,468 | 4/1975 | Falconer et al. | 375/235 |
| 3,990,010 | 11/1976 | Bennett . | |
| 4,028,626 | 6/1977 | Motley et al. | 375/235 |
| 4,061,978 | 12/1977 | Motley et al. | 375/232 |
| 5,195,106 | 3/1993 | Kazecki et al. | 375/230 |
| 5,400,370 | 3/1995 | Guo . | |
| 5,434,884 | 7/1995 | Rushing et al. | 375/235 |

FOREIGN PATENT DOCUMENTS 0 084 628  12/1982  European Pat. Off. .

OTHER PUBLICATIONS

"Jitter–Based Adaptive Equalization", by Feldbaumer et al., Motorola Technical Developments, vol. 29, Nov. 1, 1996, pp. 171–172.

*Primary Examiner*—Stephen Chin
*Assistant Examiner*—Lenny Jiang

[57] ABSTRACT

An optimum equalizer setting is determined for a signal equalizer in a network receiver by successively setting the equalizer to different predetermined settings, detecting timing correlation results between the equalized signal and a recovered clock in a digital phase locked loop, and determining a normalized distribution result for each of the predetermined equalizer settings based on the timing correlation results. The equalizer setting having the minimum normalized distribution result can then be selected as the optimum equalizer setting. Use of the correlation result from the phase locked loop enables the equalizer controller determining the optimum equalizer setting to determine the setting using a closed-loop setting. Hence, the equalizer controller can effectively determine the equalizer setting that causes the minimum amount of jitter in the phase locked loop.

28 Claims, 4 Drawing Sheets

APPARATUS AND METHOD FOR DETERMINING AN OPTIMUM EQUALIZER SETTING FOR A SIGNAL EQUALIZER IN A COMMUNICATION NETWORK RECEIVER

BACKGROUND OF THE INVENTION

1. Technical Field

The present invention relates to communication network transceivers, more specifically to techniques for adjusting equalizer setting for reception of transmitted data from a network medium.

2. Background Art

Local area networks use a network cable or other network media to link nodes (e.g., workstations, routers and switches) to the network. Each local area network architecture uses a physical layer (PHY) transceiver for translating digital data into an analog signal for transmission on the network medium. The PHY transceiver also is configured for receiving analog signals transmitted from a remote node via the network medium and recovering the digital data from the received analog signals.

Figure 1:
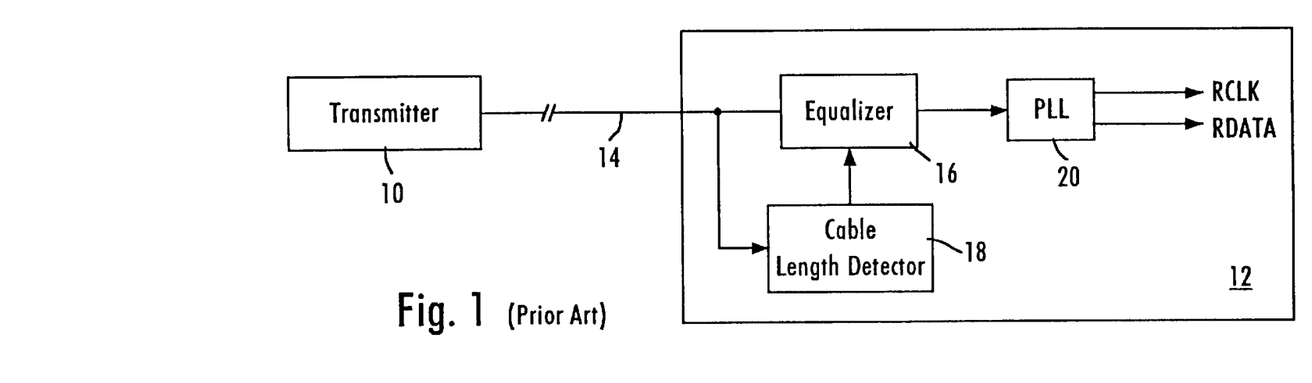
FIG. 1 is a block diagram illustrating a conventional receiver system for equalizing received data signals.

FIG. 1 is a block diagram illustrating a conventional two-station network having a transmitter 10 at a first node transmitting an analog signal carrying data to a receiver 12 at a second node via a network medium 14, for example a network cable. The signal transmitted by the medium 14 will experience different attenuation and intersymbol interference based on different cable lengths, as well as voltage and temperature variations. Hence, the receiver 12 must equalize the input signal from the medium 14 to compensate for the attenuation and intersymbol interference.

As shown in FIG. 1, the receiver 12 includes an equalizer 16, a cable length detector 18, and a phase locked loop (PLL) 20. The equalizer 16 attempts to compensate for the attenuation and intersymbol interference based on predetermined cable length settings, specified by the cable length detector 18. The cable length detector 18 detects the length of the cable medium 14 by monitoring the input waveform from the medium 14, and estimating the cable length of the medium 14 based on the attenuation characteristics, for example the signal amplitude or rise time (e.g., slew rate) of the signal. The phase locked loop 20 then recovers the clock signal (RCLK) and the transmitted data (RDATA) from the equalized signal.

The PLL 20 determines the phase and frequency relationship of the incoming data signal in order to determine the best sampling points. In particular, the data bits in the equalized signal output by the equalizer 16 are ideally recovered by sampling at the center of each bit. Since the frequency and phase of the reference clock in the transmitter 10 and the reference clock in the receiver 12 are slightly different, the PLL 20 is needed to determine the best sampling points in the equalized signal. Hence, it is important for high speed receivers to correctly determine the cable length in order to perform proper equalization so that the incoming data signal can be recovered by the PLL 20.

Differences in phase between the incoming signal and the reference clock of the receiver 12 can arise due to differences in the frequency and phase of the transmitter and receiver reference clocks, as well as jitter introduced by the medium 14. The PLL 20 is generally able to adjust to the phase differences encountered due to the relatively small differences in the frequency and phase between the transmitter and receiver reference clocks. Jitter introduced by the medium 14 and the transmitter/receiver system, however, is instantaneous, such that the PLL 20 does not have time to adjust for the relatively quick phase shift. Hence, the jitter may cause the PLL to output erroneous data on the data signal (RDATA).

In addition, the equalizer 16 must be properly configured for the PLL 20 to work properly. If the data signal received from the medium 14 is not properly equalized, the attenuation and intersymbol interference will show up as jitter in the equalized signal. Although the PLL 20 can theoretically tolerate jitter up to the period it takes to transmit one bit, in practice this jitter tolerance is somewhat less than the full bit for high speed data transmissions.

A problem with the receiver 12 of FIG. 1 is that the cable length is detected via an open loop. In other words, there is no feedback as to whether or not the equalizer setting selected by the cable length detector 18 is the optimal equalizer setting to use to minimize jitter. Hence, the cable length detector 18 may not select the optimum equalizer setting, causing additional jitter to be introduced into the equalized signal. Hence, the data signal (RDATA) may have erroneous data because the phase locked loop 20 is unable to recover from the jitter conditions introduced by the receiver 12 in the equalized signal.

SUMMARY OF THE INVENTION

There is a need for an arrangement in a high speed receiver for determining an optimum equalizer setting for a signal equalizer in a manner that minimizes jitter encountered by a phase locked loop during clock and data recovery.

There is also a need for an arrangement that determines an optimum equalizer setting based on a closed loop system, where the optimum equalizer setting is determined based on the amount of jitter encountered by the phase locked loop for each of the available equalizer settings.

These and other needs are attained by the present invention, where the distribution of an input signal edge relative to a recovered clock signal is used to determine the amount of jitter encountered for an equalizer setting, and where an optimum equalizer setting is selected based on the normalized distribution results for the respective equalizer settings.

According to one aspect of the present invention, a method determines an optimum equalizer setting for a signal equalizer, configured for receiving an input signal from a medium and in response outputting an equalized signal. The method includes setting the signal equalizer to one of a plurality of predetermined equalizer settings. A correlation result is received from the phase locked loop that specifies a timing correlation of a detected edge of the equalized signal, generated based on the one predetermined equalizer setting, relative to a recovered clock signal. A normalized distribution result is determined for each of the predetermined equalizer settings based on a corresponding set of the correlation results for a predetermined number of the detected edges. The optimum equalizer setting is selected from the predetermined equalizer settings based on the corresponding normalized distribution result. Receiving the correlation result that specifies the timing correlation of a detected edge of the equalized signal relative to the recovered clock signal enables determination of a normalized distribution result for each of the predetermined equalizer settings. Hence, the normalized distribution result can be used to quantify the amount of jitter encountered by the phase locked loop for each equalizer setting, enabling selection of the optimum equalizer setting having the minimum amount of jitter based on the corresponding normalized distribution result.

Another aspect of the present invention provides a receiver having a signal equalizer, a phase locked loop and an equalizer controller. The signal equalizer is configured for outputting an equalized signal in response to an input signal and a selected one of a plurality of equalizer settings. The phase locked loop is configured for generating a recovered clock signal, and outputs a correlation result that specifies a timing correlation of an edge of the equalized signal relative to the recovered clock signal. The equalizer controller is configured for selecting an optimum equalizer setting based on the correlation results for each of the equalizer settings over a prescribed interval, where the equalizer controller calculates for each of the equalizer settings a normalized distribution result, and selects the optimum equalizer setting based on the corresponding normalized distribution result. Use of the correlation result from the phase locked loop enables the equalizer controller to determine the optimum equalizer setting using a closed-loop system, where each equalizer setting is used to determine the corresponding normalized distribution result. Hence, the equalizer controller can effectively determine the optimum equalizer setting based on the corresponding normalized distribution result having the minimum amount of jitter induced in the phase locked loop.

Additional objects, advantages and novel features of the invention will be set forth in part in the description which follows, and in part may become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
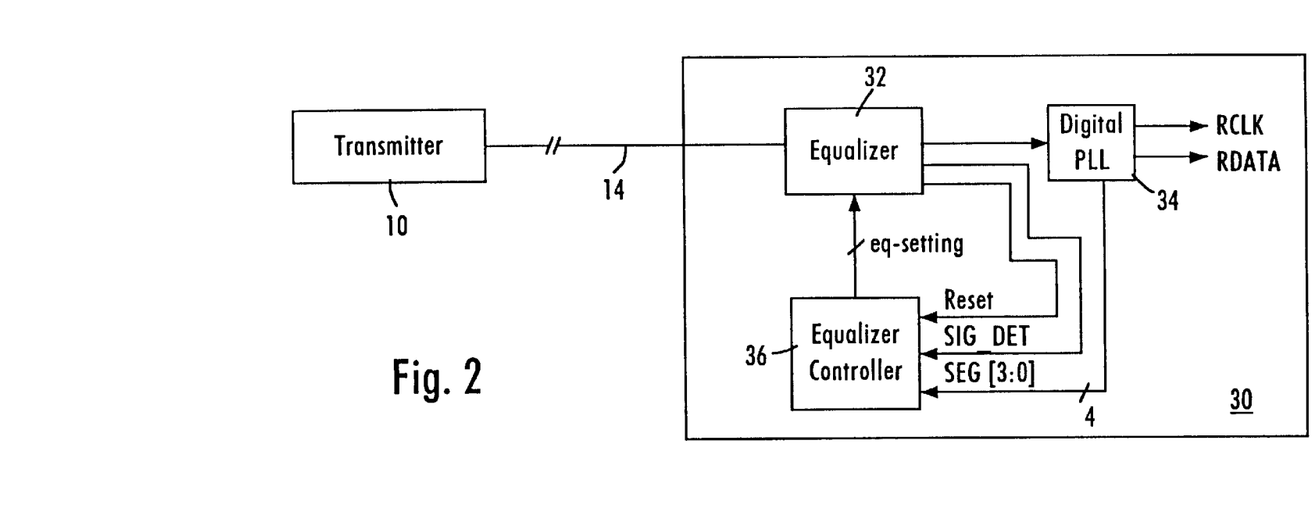
FIG. 2 is a block diagram of a receiver configured for determining an optimum equalizer setting according to an embodiment of the present invention.

FIG. 2 is a block diagram illustrating a receiver system 30 according to an embodiment of the present invention. As shown in FIG. 2, the receiver 30 includes a signal equalizer 32, a digital phase locked loop 34, and an equalizer controller 36. The equalizer 32 is configured for outputting an equalized signal in response to an input signal from the medium 14 and a selected equalizer setting (eq_setting) supplied by the equalizer controller 36. As described in detail below, the equalizer 32 also outputs a reset signal and a detection signal (SIG_DET), which may be used by the equalizer 36 to detect an initialization condition in the equalizer controller 32, for example a reset state or a disconnect state.

Figure 3:
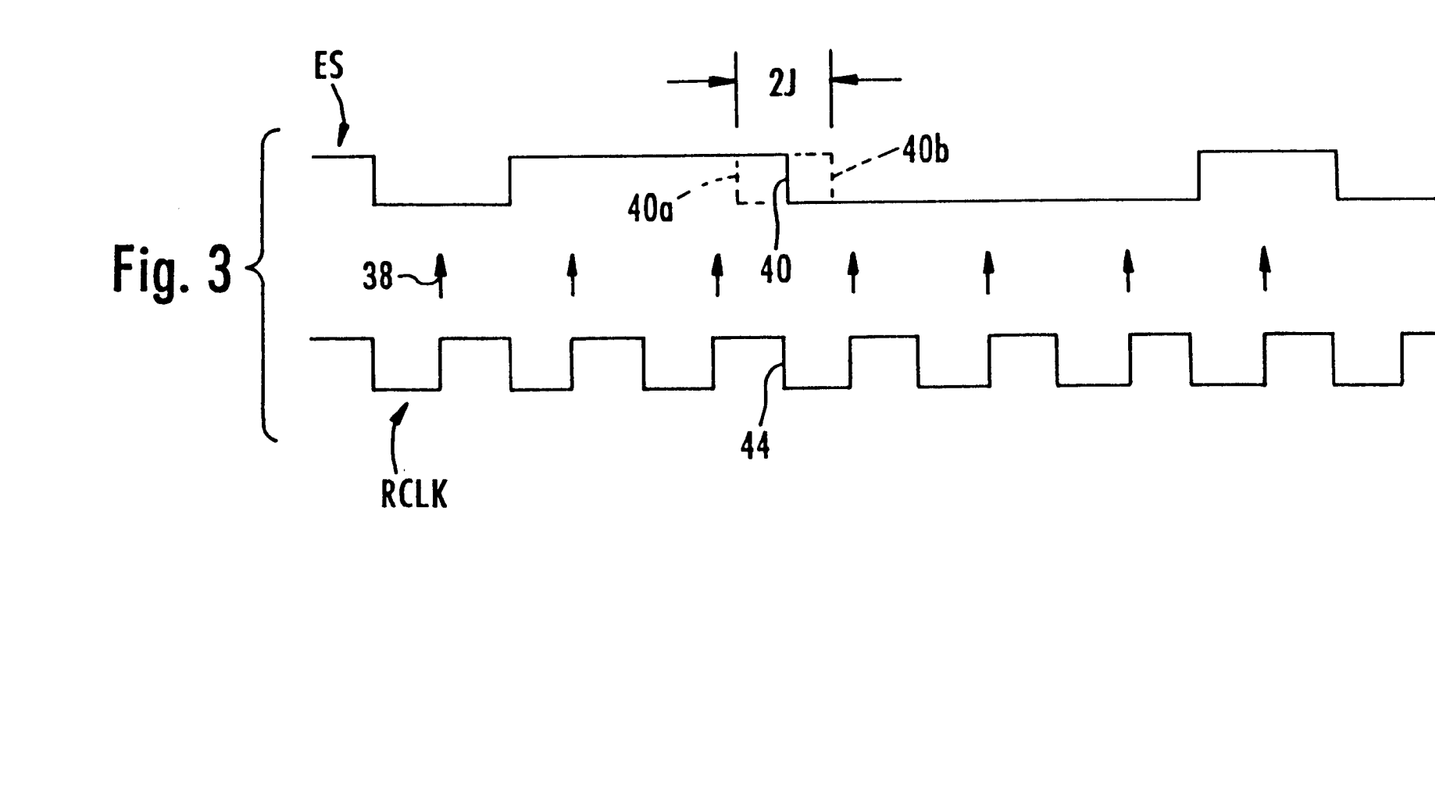
FIG. 3 is a timing diagram illustrating optimal sampling points and timing relationships used to identify a timing correlation between a detected edge of an equalized signal and a recovered clock signal according to an embodiment of the present invention.

The digital phase locked loop 34, in response to receiving the equalized signal from the equalizer 32, generates a recovered clock signal (RCLK) and recovered data signal (RDATA) based upon sampling the equalized signal with the recovered clock signal. The digital PLL 34 also generates a correlation result (SEG) that specifies a timing correlation of an edge of the equalized signal relative to the recovered clock signal (RCLK). Specifically, FIG. 3 is a diagram that illustrates sampling techniques used by the digital PLL 34 to recover the transmitted data. As shown in FIG. 3, the digital PLL 34 correlates the recovered clock (RCLK) with the equalized signal (ES). Ideally, the bits in the equalized signal (ES) are recovered by sampling at the center of each bit, indicated by the arrow 38. As shown in FIG. 3, the rising edge of the recovered clock (RCLK) coincides with the optimal sampling points 38. Jitter in the equalized signal (ES) causes an edge 40 of the equalized signal to be shifted by an amount (J) such that the ideal signal edge 40 may be shifted to edges 40a or 40b by an amount J.

Figure 4A:
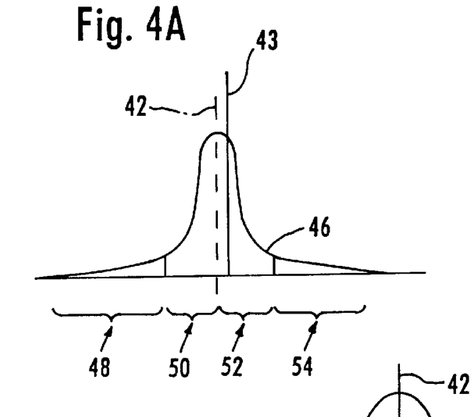
FIGS. 4A, 4B, and 4C are diagrams illustrating alternative normalized distributions used by the equalizer controller of FIG. 2 in determining an optimum equalizer setting.
Figure 4B:
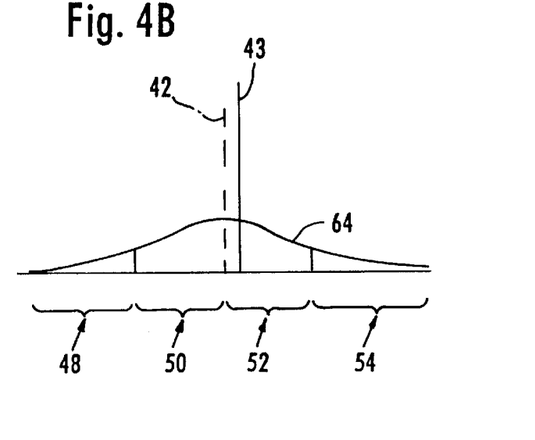
Figure 4C:
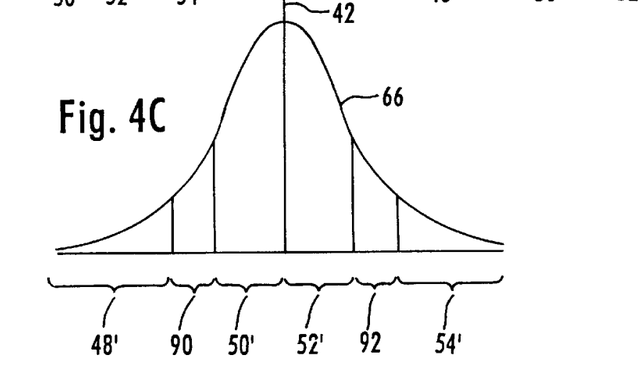

According to the disclosed embodiment, the receiver 30 determines the relative edge distribution of the equalized signal (ES) with respect to the recovered clock signal (RCLK) in order to determine whether an optimum equalizer setting is chosen. In particular, FIGS. 4A, 4B and 4C are diagrams illustrating the distribution of edges 40 of the equalized signal (ES) relative to the recovered clock (RCLK). The center line 42 represents the optimal transition point of the equalized input signal (ES), where the edge 40 of the equalized signal coincides exactly with the edge 44 of the recovered clock (RCLK), i.e., where there is no jitter. Note the center line 42 may differ from a true center line 43 due to minor frequency mismatches between the transmitter 10 and the receiver 30. Any data point on either side of the center line 42 represents an edge 40a, 40b having varying amount of jitter, where distribution regions 48 and 54 correspond to edges 40a, 40b having a substantially large amount of jitter. Hence, FIGS. 4A, 4B, and 4C illustrate respective normalized distributions 46, 64, and 66 of the edges 40 of the equalized signal correlated with respect to time relative to the recovered clock signal (RCLK). Since jitter is random, the randomized distribution of jitter has the shape of distribution curve 46 in FIG. 4A if the equalizer 42 is optimized to minimize the occurrence of jitter in the outer ranges 48 and 54, such that most of the jitter is maintained within the inner regions 50 and 52.

FIG. 4B is a diagram illustrating a second distribution 64, where the random occurrence of jitter is statistically spread out, such that outer regions 48 and 54 have a significantly higher incidence of jitter than regions 48 and 54 in FIG. 4A. Hence, the distribution curve 64 of FIG. 4B illustrates the occurrence of jitter having a greater deviation from the center line 42. As will be recognized in the art, the equalizer setting causing the distribution of jitter as shown in FIG. 4B results in relatively lower performance than the distribution of jitter 46 as shown in FIG. 4A.

According to the disclosed embodiment, the equalizer controller 36 counts the number of transitions occurring in any of the four segments 48, 50, 52, 54, and selects as an optimal equalizer setting the one predetermined equalizer setting that results in the minimum number of transitions occurring in the outer regions 48 and 54. Specifically, the digital PLL 34, in response to detecting an edge transition 40 relative to a clock pulse edge 44, outputs a segment signal (SEG) as a digital code that identifies the distribution range 48, 50, 52, or 54 that corresponds to the timing correlation between the detected edge 40 of the equalized signal (ES) and the edge 44 of the recovered clock signal (RCLK). Hence, the 4-bit digital code SEG[3:0] provides a correlation result from the PLL 34 by storing a bit corresponding to the segment 48, 50, 52, or 54. For example, the digital code SEG[0] equals 1 if the transition 40 relative to edge 44 occurs in segment 48; SEG[1] goes high if the transition occurs in segment 50; SEG[2] equals 1 if the transition occurs in segment 52; and SEG[3] goes high if the transition occurs in segment 54. An exemplary PLL 34 configured for generating the segment signal (SEG) is illustrated in U.S. Pat. No. 5,400,370.

Hence, the digital PLL 34 generates a correlation result (SEG) that specifies a timing correlation of the detected edge 40 of the equalized signal relative to the recovered clock signal (RCLK). As described below, the equalizer controller 36 determines a normalized distribution result for each of the equalizer settings (eq_setting), and selects the optimum equalizer setting based on the corresponding normalized distribution result having the minimum value.

Figure 5:
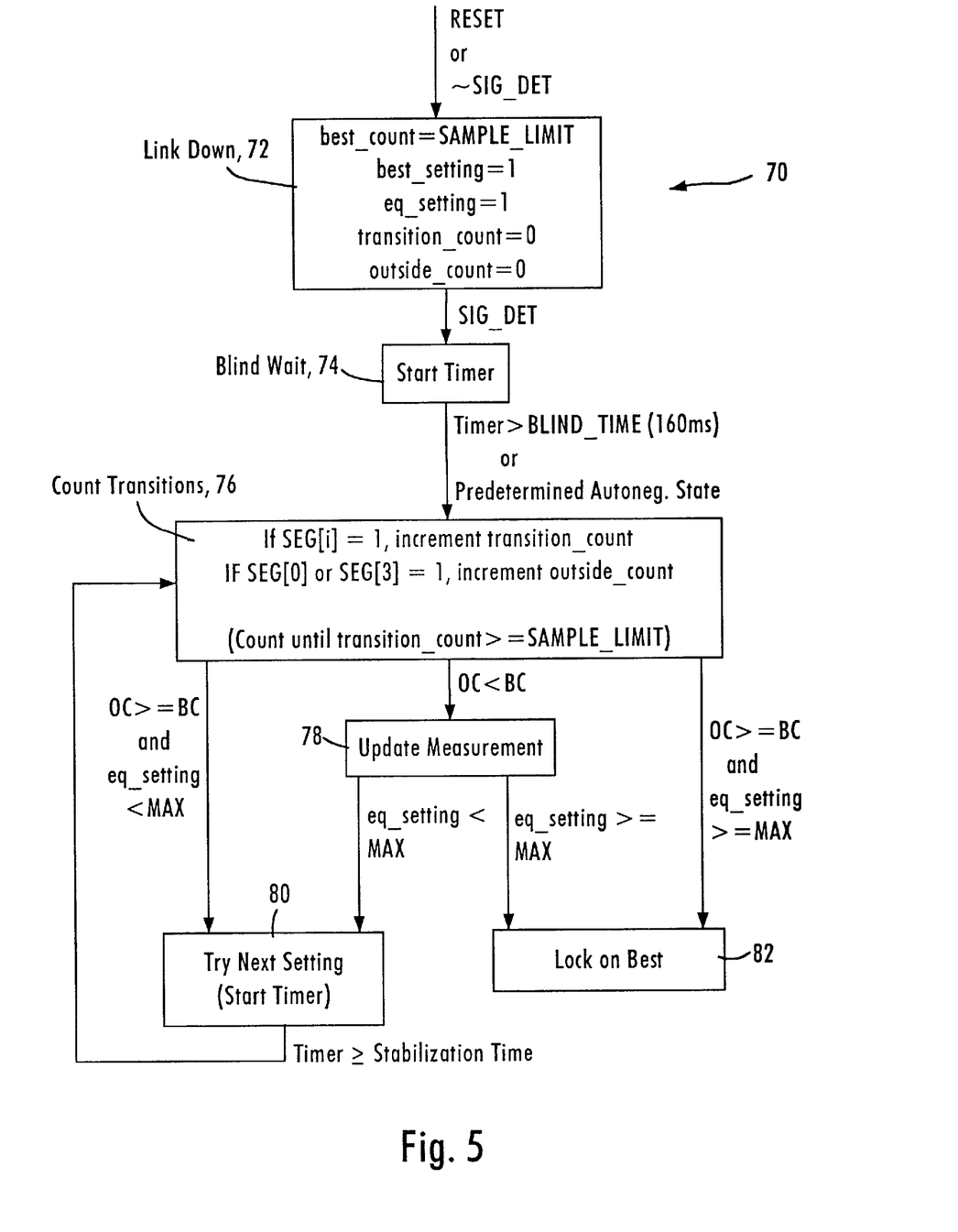
FIG. 5 is a diagram illustrating a state machine in the equalizer controller of FIG. 2.

FIG. 5 is a block diagram illustrating a state machine 70 in the equalizer controller 36 for determining the normalized distribution result for each of the predetermined equalizer settings, and selecting the optimum equalizer setting according to an embodiment of the present invention. As will be recognized in the art, the state machine 70 can be implemented as logic circuits and latches configured for storing selected state variables and performing various logical operations based on detected events and respective state variables.

As shown in FIG. 5, the state machine includes a link down state 72, executed by the equalizer controller 36 in response to reception of either a reset signal or deassertion of the signal detect signal (SIG_DET), indicating no signal is present on the medium 14. The link down state 72 resets internal state variables in preparation for determining the optimum equalizer setting upon detection of a signal on the medium 14. As illustrated in FIG. 5, the state variable "best_count" identifies the lowest distribution result detected among the predetermined equalizer settings that have been tested. The state variable "best_setting" identifies the optimum candidate equalizer setting among the predetermined equalizer settings that have been tested. The state variable "eq_setting" identifies the predetermined equalizer setting currently selected by the equalizer controller 36 for use by the equalizer 32 during testing. The state variable "transition_count" identifies the total number of transitions 40 detected for a given equalizer setting, and "outside_count" identifies the number of transitions detected within the outer regions 48 or 54.

As shown in the link down state 72, the variable "best_count" is initialized to a worst-case predetermined value of "SAMPLE_LIMIT." The variables "best_setting" and "eq_setting" are set to the first predetermined equalizer setting for testing, and the count values "transition_count" and "outside_count" are set to 0. As described below, the predetermined equalizer settings are preferably successively selected according to successively longer cable lengths, respectively. Hence, the equalizer setting "1" identifies the equalizer setting for a minimum cable length, such that the sequence of equalizer settings 1, 2, . . . "MAX" corresponds to equalizer settings for the minimum cable length up to the maximum cable length, respectively.

The equalizer controller 36 remains the link down state 72 until reception of the detection signal (SIG_DET). The detection signal SEG_DET is a logical signal output by the equalizer 32 that indicates that signal transitions are occurring above a defined threshold, for example when a cable is connected to the receiver 30.

In response to detection of the input signal by the equalizer 32, the equalizer controller 36 enters into a blind wait state 74, where a timer is started in response to the detection signal (SIG_DET). The equalizer controller 36 enters a blind wait state 74 in order to prevent any transient noise on the medium 14 from adversely affecting the evaluation of the equalizer settings. According to the disclosed embodiment, the equalizer controller 36 remains in the blind wait state until the timer has counted about 160 milliseconds, assuming no auto-negotiation occurs. If auto-negotiation occurs between the receiver 30 and the transmitter 10, for example by the exchange of link pulses, the equalizer controller 36 exits the blind wait state 74 upon detecting a predetermined auto-negotiation state. Hence, the blind wait state 74 prevents the equalizer controller 36 from calibrating on a noisy signal when a cable is first plugged into the receiver 30.

The equalizer controller 36 exits the blind wait state 74 and enters a count transition state 76 in order to determine the normalized distribution result for each of the predetermined equalizer settings. Specifically, the count transition state 76 counts the number of signal transitions on the incoming data signal. The total number of transitions is counted using the "transition_count" state variable, and the number of transitions of the outside segments 48 and/or 54 are counted using the "outside_count" (OC) state variable. Hence, if any digital code (SEG) representing any correlation result is received from the digital PLL 34, the count transitions state 76 increments the transition count. However, the count transitions state 76 increments the "outside_count" variable only upon receiving the digital code SEG[0] or SEG[3] that identifies a transition in regions 48 and 54, respectively. The equalizer controller 36 continues to count the number of digital codes SEG[0], SEG[3] that identify the outer ranges for a predetermined sampling interval, e.g., until the transition count reaches the predetermined number of count values (SAMPLE_LIMIT). Hence, the outside count value for the corresponding equalizer setting is normalized with respect to the transition count equal to SAMPLE_LIMIT.

Once the transition count reaches the sampling interval of SAMPLE_LIMIT, the equalizer controller 36 executes states 78, 80, or 82 depending on the "outside_count" (OC) value, and whether all equalizer settings have been tested based on the value of the equalizer setting (eq_setting). Specifically, if the "outside_count" variable (OC) counted in the count transitions state 76 is less than the "best_count" (BC) variable, the values of the "best_count" and "best_setting" are updated in the update measurement state 78. Hence, the update measurement state 78 is executed by the equalizer controller 36 if the selected equalizer setting (eq_setting) provides a local minimum in the normalized distribution result, indicating that the amount of detected jitter is at a minimum.

Once the update measurement state 78 updates the state variables "best_count" with the "outside_count" from state 76 and the "best_setting" variable with the currently-selected equalizer setting (eq_setting), the equalizer controller 36 moves to the try next setting state 80 if the selected equalizer setting (eq_setting) is less than the maximum equalizer setting (MAX), indicating that additional equalizer settings still need to be tested. The try next setting state 80 increments the equalizer setting variable (eq_setting) to the next predetermined equalizer setting corresponding to the next successive cable length, and resets the "transition_count" and the "outside_count" variables to 0. The equalizer setting is output from the equalizer controller 36 to the equalizer 32, causing the equalizer 32 to reset its signal response characteristics for the next length of cable.

A timer also is started in state 80 in response to outputting the updated equalizer setting to the equalizer 32. The timer counts a stabilization time interval, enabling the digital PLL 34 to recalibrate to the new equalizer setting, since changing the equalizer setting may potentially create a phase shift to the equalized incoming signal. Hence, the equalizer controller 36 remains in the try next setting state 80 until the timer reaches the stabilization time, for example 0.1 milliseconds.

The state machine moves from the try next setting state 80 to the count transition state 76, such that the equalizer controller 36 determines the normalized distribution result for each of the predetermined equalizer settings based on the corresponding set of correlation results (SEG) for a predetermined number (SAMPLE_LIMIT) of the detected edges. Once the equalizer setting (eq_setting) reaches the last setting (e.g., MAX) corresponding to the equalizer setting for the longest cable length, the equalizer controller 36 executes the update measurement state 78, if necessary, and enters the lock on best state 82 where the optimum equalizer setting (best_setting) is selected from the predetermined equalizer settings based on the corresponding normalized distribution result having a minimum value (best_count).

According to the disclosed embodiment, an optimum equalizer setting is determined for a signal equalizer by successively setting the equalizer to different predetermined settings, and determining the normalized distribution result for each of the predetermined equalizer settings based on timing correlation results output by the digital phase locked loop. Hence, the optimum equalizer setting can be quickly determined to minimize jitter. According to the disclosed embodiment, the entire procedure for determining the optimum equalizer setting can be executed within one millisecond of exiting the blind wait state 74. Hence, the disclosed arrangement is particularly effective for receiver systems in 100 Mb/s Ethernet (IEEE 802.3) networks.

The disclosed embodiment may also be used to monitor equalizer performance over time. In particular, a second receiver system 30' including a second equalizer 32', a second digital PLL 34', and a second equalizer 36' may be added in parallel to the first receiver system 30, where the second receiver system 30' determines an updated optimal equalizer setting while the first receiver system 30 is recovering the data from the input signal on the medium 14. Once the second receiver system 30' determines the updated optimal equalizer setting and calibrates the equalizer 32' with the updated optimal equalizer setting, a receiver controller (not shown) may switch to the second receiver system. For example, the receiver controller (not shown) may initially select the recovered data (RDATA) from the first receiver system (30), and then select recovered data (RDATA') from the second receiver system 30' in response to detecting idle bits (e.g., no transitions) on the first recovered data stream (RDATA). Hence, an advanced receiver system may periodically update the optimum equalizer settings by alternating between two receiver systems 30 and 30', where one receiver system is recovering the data while the other receiver system is determining an updated optimized equalizer setting.

Figure 6A:
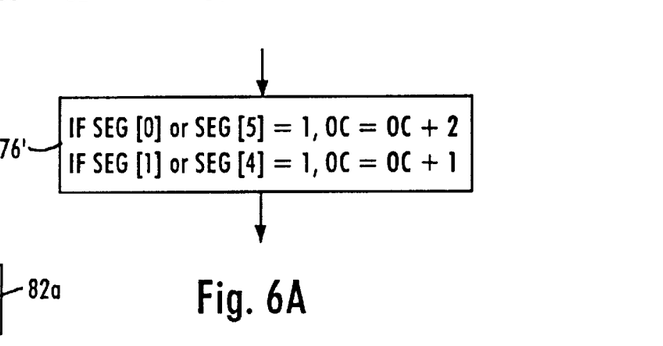
FIGS. 6A and 6B are diagrams illustrating variations of the state machine of FIG. 5.

The above-described embodiment is not limited to use of four distribution segments (i.e., distribution ranges) 48, 50, 52, and 54. Rather, additional segments may be used, depending on the statistical significance in distinguishing the distribution of jitter in different equalizer settings. For example, FIG. 4C illustrates a distribution 66 having six distribution ranges that define a distribution of the detected edges of the equalized signal. The distribution 66 includes outer ranges 48' and 54', inner ranges 50' and 52', and middle ranges 90 and 92. As shown in FIG. 4C, the middle range 90 is positioned between the corresponding inner range 50' and the outer range 48', and middle range 92 is positioned between inner range 52' and outer range 54'. The 6-segment distribution ranges of FIG. 4C can be used by the equalizer controller 36 by modifying the count transitions state 76 as shown in FIG. 6A. In particular, state 76' has a weighing factor that is assigned for each segment. If a transition occurs in outer segments 0 (48') or 5 (54'), the outermost segments are counted twice for each transition. If a transition is detected in middle segments 1 (90) or 4 (92), the transition is counted once (i.e., a weighing factor of 1). Hence, the outer (48', 54'), middle (90, 92) and inner (50', 52') regions are assigned a weighted factor of 2, 1, 0, respectively.

Figure 6B:
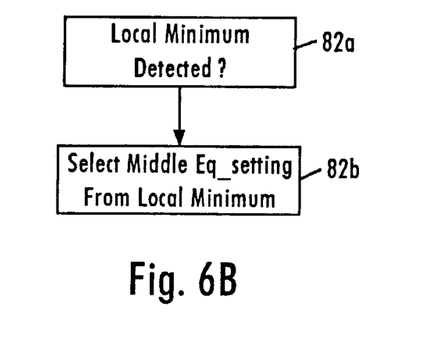

Another alternative involves detection of a local minimum, as shown in FIG. 6B. For example, assume that the entire domain of equalizer settings includes settings A, B, C, D, E, F, and G. If equalizer settings C, D, and E each have the same minimum outside count indicating a local minimum in state 82a, the state 82b will select the middle equalizer setting (e.g., D) as the optimum equalizer setting.

Although the disclosed embodiment describes successively testing equalizer settings by starting with the predetermined equalizer setting corresponding to a minimum length and successively testing equalizer settings for successively longer cable lengths, the disclosed embodiment is not limited to any particular sequence for testing the equalizer settings. For example, the disclosed embodiment may be modified by initially testing the equalizer setting corresponding to the maximum length setting, and successively testing equalizer settings for successively shorter cable lengths.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of determining an optimum equalizer setting for a signal equalizer configured for receiving an input signal from a medium and in response outputting an equalized signal, the method comprising:

setting the signal equalizer to one of a plurality of predetermined equalizer settings;

receiving a correlation result from a phase locked loop, the correlation result specifying a timing correlation of a detected edge of the equalized signal, generated based on the one predetermined equalizer setting, relative to a recovered clock signal generated by the phase locked loop;

determining a normalized distribution result for each of the predetermined equalizer settings based on a corresponding set of the correlation results for a predetermined number of the detected edges; and selecting the optimum equalizer setting from the predetermined equalizer settings based on the corresponding normalized distribution result.

2. The method of claim 1, wherein the setting step comprises setting the signal equalizer to an identified one of the predetermined equalizer settings corresponding to a minimum cable length in response to a detected initialization condition.

3. The method of claim 2, further comprising detecting the initialization condition as detection of the input signal following one of a reset condition and a signal detection condition.

4. The method of claim 3, wherein the detecting step includes receiving a detection signal from the signal equalizer specifying detection of an edge in the input signal.

5. The method of claim 3, wherein the detecting step includes receiving a reset signal from the signal equalizer.

6. The method of claim 2, wherein the determining step includes successively determining the normalized distribution results for the predetermined equalizer settings according to successively longer cable lengths, respectively, in response to the detected initialization condition.

7. The method of claim 2, further comprising waiting in a predetermined state in response to the detected initialization condition before the receiving step.

8. The method of claim 7, wherein the waiting step comprises waiting in the predetermined state until detecting one of a predetermined auto-negotiation state and expiration of a predetermined time interval.

9. The method of claim 8, wherein the waiting step comprises waiting the predetermined time interval of about 160 milliseconds based on an absence of the predetermined auto-negotiation state.

10. The method of claim 8, wherein the selecting step includes selecting the optimum equalizer setting within 1 millisecond of detecting the one predetermined auto-negotiation state.

11. The method of claim 1, wherein the receiving step comprises receiving a digital code representing the correlation result within one of a plurality of distribution ranges, the distribution ranges defining a distribution of the detected edges of the equalized signal relative to the recovered clock signal, the distribution ranges including a group of outer ranges.

12. The method of claim 11, wherein the group of outer ranges correspond to substantially unrecoverable jitter conditions in the equalized signal detected by the phase locked loop.

13. The method of claim 11, wherein the determining step comprises for each of the predetermined equalizer settings:

(1) counting during a sampling interval a counted number of the digital codes identifying the outer ranges as said normalized distribution result, the sampling interval corresponding to a predetermined number of the received digital codes for the corresponding predetermined equalizer setting; and (2) storing the counted number of digital codes if less than a previously-stored counted number of digital codes identifying one of the outer ranges.

14. The method of claim 13, wherein the selecting step comprises selecting the one predetermined equalizer setting corresponding to the stored counted number of digital codes.

15. The method of claim 13, wherein the distribution ranges include a group of inner ranges within the outer ranges and a group of middle ranges, each middle range between corresponding inner and outer ranges.

16. The method of claim 15, wherein the counting step comprises:

weighting each digital code based on the corresponding range; and summing the weighted digital codes during the corresponding sampling interval to obtain said normalized distribution result.

17. The method of claim 1, further comprising:

determining whether a first group of the predetermined equalizer settings, each corresponding to a successively longer cable length, has a same minimum normalized distribution result;

wherein the selecting step comprises selecting a median equalizer setting from the first group based on determining the first group has the same minimum normalized distribution result.

18. A method in a receiver, having a signal equalizer and a phase locked loop, of determining an optimum equalizer setting for the signal equalizer, the method comprising:

successively setting the signal equalizer to one of a plurality of predetermined equalizer settings;

outputting an equalized signal from the signal equalizer in response to an input signal and based on the one predetermined equalizer setting;

generating a correlation result in the phase locked loop that specifies a timing correlation of a detected edge of the equalized signal relative to a recovered clock signal generated by the phase locked loop;

determining a normalized distribution result for each of the predetermined equalizer settings based on a corresponding set of the correlation results for a predetermined number of the detected edges; and selecting the optimum equalizer setting from the predetermined equalizer settings based on the corresponding normalized distribution result.

19. The method of claim 18, wherein the setting step comprises setting the signal equalizer to an identified one of the predetermined equalizer settings corresponding to a minimum cable length in response to a detected initialization condition.

20. The method of claim 19, wherein the determining step includes successively determining the normalized distribution results for the predetermined equalizer settings according to successively longer cable lengths, respectively, in response to the detected initialization condition.

21. The method of claim 19, further comprising waiting in a predetermined state, in response to the detected initialization condition before the receiving step, until detecting one of a predetermined auto-negotiation state and expiration of a predetermined time interval.

22. The method of claim 18, wherein the generating step comprises:

establishing a plurality of distribution ranges defining a distribution of the detected edges of the equalized signal relative to the recovered clock signal, the distribution ranges including a group of outer ranges that correspond to substantially unrecoverable jitter conditions in the equalized signal; and outputting a digital code as said correlation result that identifies the distribution range corresponding to the timing correlation.

23. The method of claim 22, wherein the determining step comprises:

for each of the predetermined equalizer settings:

(1) counting during a sampling interval a counted number of the digital codes identifying the outer ranges as said normalized distribution result, the sampling interval corresponding to a predetermined number of the received digital codes for the corresponding predetermined equalizer setting; and (2) storing the counted number of digital codes if less than a previously-stored counted number of digital codes identifying one of the outer ranges.

24. The method of claim 23, wherein the distribution ranges include a group of inner ranges within the outer ranges and a group of middle ranges, each middle range between corresponding inner and outer ranges.

25. The method of claim 24, wherein the counting step comprises:
weighting each digital code based on the corresponding range; and
summing the weighted digital codes during the corresponding sampling interval to obtain said normalized distribution result.

26. A receiver comprising:
a signal equalizer configured for outputting an equalized signal in response to an input signal and a selected one of a plurality of equalizer settings;
a phase locked loop for generating a recovered clock signal, the phase locked loop outputting a correlation result that specifies a timing correlation of an edge of the equalized signal relative to the recovered clock signal; and
an equalizer controller for selecting an optimum equalizer setting based on the correlation results for each of the equalizer settings over a prescribed interval, the equalizer controller calculating for each of the equalizer settings a normalized distribution result and selecting the optimum equalizer setting based on the corresponding normalized distribution result.

27. The receiver of claim 26, wherein the phase locked loop outputs the correlation result as a digital code identifying one of a plurality of distribution ranges defining a distribution of the detected edges of the equalized signal relative to the recovered clock signal, the distribution ranges including a group of outer ranges that correspond to substantially unrecoverable jitter conditions in the equalized signal.

28. The receiver of claim 27, wherein the equalizer controller includes a state machine for selecting the optimum equalizer setting, the state machine including:
first logic for counting, during a sampling interval, a counted number of the digital codes identifying the outer ranges as the normalized distribution result for the corresponding equalizer setting, the sampling interval counting the sampling interval as a predetermined number of the digital codes for the corresponding equalizer setting; and
second logic for identifying a minimum of the normalized distribution results, and the corresponding equalizer setting as the optimum equalizer setting.

* * * * *